United States Patent
Proctor et al.

(10) Patent No.: US 7,709,800 B2
(45) Date of Patent: May 4, 2010

(54) METHOD AND APPARATUS FOR REJECTING RADIOACTIVE INTERFERENCE IN A RADIATION MONITORING STATION

(75) Inventors: Alan Proctor, Knoxville, TN (US); William Richardson, Knoxville, TN (US)

(73) Assignee: Nucsafe, Inc., Oak Ridge ( * ) Notice: Subject to any disclaimer, the term of this patent is extended or adjusted under 35 U.S.C. 154(b) by 93 days.

(21) Appl. No.: 11/616,600

(22) Filed: Dec. 27, 2006

(65) Prior Publication Data

US 2008/0157986 A1 Jul. 3, 2008

(51) Int. Cl.
*G01N 21/00* (2006.01)
*G01T 1/00* (2006.01)

(52) U.S. Cl. .............. 250/359.1; 250/358.1; 378/57

(58) Field of Classification Search ............. 250/359.1, 250/358.1
See application file for complete search history.

(56) References Cited

U.S. PATENT DOCUMENTS

| | | | |
|---|---|---|---|
| 3,436,539 A | 4/1969 | Wilcox | |
| 4,172,226 A | 10/1979 | Rubin | |
| 4,398,668 A | 8/1983 | Jette | |
| 4,493,212 A * | 1/1985 | Nelson | 73/800 |
| 4,509,042 A | 4/1985 | Kruse | |
| 4,566,337 A * | 1/1986 | Smart | 73/861.56 |
| 5,109,227 A | 4/1992 | Godfrey | |
| 5,129,584 A | 7/1992 | Ridenour | |
| 5,468,960 A * | 11/1995 | Sugimoto et al. | 250/338.3 |
| 5,500,530 A * | 3/1996 | Gregoris | 250/339.11 |
| 5,580,784 A * | 12/1996 | Berndt | 435/288.7 |
| 5,828,051 A | 10/1998 | Goto | |
| 6,657,202 B2 | 12/2003 | Mikami et al. | |
| 6,881,957 B2 * | 4/2005 | Dougherty et al. | 250/338.3 |
| 6,989,541 B2 | 1/2006 | Penn | |
| 7,141,799 B1 | 11/2006 | Neal et al. | |
| 7,265,353 B2 * | 9/2007 | Evans | 250/366 |
| 2003/0178575 A1 * | 9/2003 | Mallette | 250/394 |
| 2004/0000999 A1 * | 1/2004 | Turner et al. | 340/572.4 |
| 2005/0029460 A1 * | 2/2005 | Iwatschenko-Borho et al. | 250/359.1 |

(Continued)

OTHER PUBLICATIONS

Ely, et al. "The use of energy windowing to discriminate SNM from NORM in radiatoin portal monitors". Nuclear Instruments & Methods in Physics Research A, vol. 560, Elsevier, published Feb. 13, 2006 pp. 373-387.*

(Continued)

*Primary Examiner*—David P Porta
*Assistant Examiner*—Yara B Green
(74) *Attorney, Agent, or Firm*—Luedeka, Neely & Graham, P.C.

(57) ABSTRACT

Methods and apparatuses for rejecting radioactive interference in a radiation monitoring station. Techniques typically include two radiation detectors positioned to acquire first and second radiation measurements from a moving radiological source in substantially distinct fields of view. A transition zone is established between the fields of view. A function yielding a dependent variable is defined at least in part by the first radiation level measurement and the second radiation level measurement. A detection alert is generated when the dependent variable reaches the first threshold value. In some embodiments a determination is mage as to whether the monitoring station is occupied as a condition for generating a detection alert, and in some embodiments a determination is made as to whether the detected radiological source is likely innocuous or offensive prior to generating a detection alert.

20 Claims, 9 Drawing Sheets

U.S. PATENT DOCUMENTS

2005/0056791 A1    3/2005    Donaghue et al.
2005/0205793 A1    9/2005    Bohine, Jr.
2006/0284094 A1*  12/2006  Inbar ........................ 250/359.1
2006/0289775 A1*  12/2006  Inbar ...................... 250/370.11

OTHER PUBLICATIONS

Daly et al., Interpretations and Uses of Medical Statistics, Fifth Edition, Blackwell Science Ltd, published 2000, p. 62.*

* cited by examiner

METHOD AND APPARATUS FOR REJECTING RADIOACTIVE INTERFERENCE IN A RADIATION MONITORING STATION

FIELD

This invention relates to the field of radiation detection. More particularly, this invention relates to the detection of radiological sources moving through a radiation monitoring station.

BACKGROUND

Various types of radiation monitoring stations are used to inspect a stream of vehicles. shipping containers, packages, luggage, persons, animals, manufactured products, process materials, waste materials, and similar items to determine whether any radiological material is present therein. In such systems a flow of articles to be inspected is typically configured to pass by or through the monitoring station. For example, pedestrian portal monitors may be designed for detection of microcurie-levels of special nuclear materials. In a conventional designs the portal contains one or two large gamma detectors, usually plastic scintillators or NaI (Tl) detectors on each side of the portal. The detectors are generally designed so that they issue an alarm for a count rate that is statistically above the background count rate which would be detected when no radiation sources are near the portal. The statistically significant (alarm threshold) level may be calculated from cumulative probability distributions. A complicating effect that is common with such monitoring stations is that radiological sources that are in the queue to pass by or through the radiation monitoring station may trigger an alarm in the station before the article or material actually bearing the radiological source reaches the station. As a consequence, material that has reached the station ahead of the actual radiological source may be falsely identified as containing the radiological source.

One example illustrating this problem is a radioactive source present in a medical patient who has received a radionuclide administration and is in a queue approaching a pedestrian radiation monitoring portal. The radioactivity levels of many medical radionuclides are a thousand to more than ten thousand times the radioactivity level that pedestrian portal systems are typically designed to detect. Because the portal has typically been designed to detect much smaller radioactive sources, a nearby medical radioisotope source generally leads to detector count rates that are above the alarm threshold when the large activity medical source is still a long distance (often 5 to 10 meters) from the portal. If a continuous queue of pedestrians (vehicles, etc.) is moving through the portal then the alarm will appear to be due to the person (vehicle, etc.) within the portal, but the alarm is actually caused by a radiation source further back in the queue. All persons/things in the queue will appear to generate an alarm until the large source has cleared the portal or moved sufficiently far from the portal that it no longer causes an increase in detector count rate.

Thus, in this example, the challenge is how to avoid detaining all of the people who are in front of the medical patient and who innocently set off the alarm because they are occupying the portal when the count rate is significantly elevated due to the high gamma rate emissions from the medical patient who is in the queue behind them. The resulting interdiction of innocent persons may require secondary inspections involving specially-trained enforcement personnel and radionuclide identifier equipment. This procedure involves labor and equipment costs that are both undesirable and, for the circumstances described in this example, are unnecessary. Clearly this is not a satisfactory operating mode.

Various techniques have been developed in attempts to overcome the effects of premature detection of radiological materials in radiation monitoring stations. For example, the sensitivity of radiation detectors in the radiation monitoring station may be decreased to minimize premature detection. However this has the disadvantage of potentially failing to detect a small quantity of offensive radioactive material as it passes through the radiation monitoring station. Another technique that has been attempted is to shield the radiation detectors so that they only "see" radiation sources that are located within a specific defined small viewing angle. However, because such shields limit the viewing window to a relatively small angle, the shields must screen off very large angles around the detectors. Furthermore, because the detectors are very sensitive, being typically designed to detect very small quantities (e.g., micro-curies) of special nuclear material, the shields must be very bulky in order to prevent the undesired detection of larger quantities of special nuclear material that are outside the specified small viewing angle. This shielding bulk adds considerable undesired weight and cost to the monitoring station.

What are needed therefore are methods and systems for rejecting radioactive interference in radiation monitoring stations from nearby radiation sources.

SUMMARY

In one embodiment the present invention provides a method for detecting radioactive emissions in a radiation monitoring station. The method includes the step of acquiring a first radiation measurement from a moving radiological source over a first field of view in the radiation monitoring station. The method continues with acquiring a second radiation measurement from the moving radiological source over a second field of view in the radiation monitoring station. At least a portion of the second field of view is substantially distinct from the first field of view and a transition zone is established between at least a portion of the first field of view and the second field of view. The method proceeds with calculating a dependent variable of a function that is defined at least in part by the first radiation level measurement and the second radiation level measurement. The method proceeds with determining when the dependent variable reaches a first threshold value as the moving radiological source moves through the transition zone, and then triggering a detection alert when the dependent variable reaches the first threshold value.

In an alternative method embodiment for detecting radioactive emissions in a radiation monitoring station the method includes the steps of measuring an entry radiation level and an exit radiation level in the portal monitoring station, and then summing the entry radiation level and the exit radiation level to obtain a total radiation level. The method continues with calculating a percentage difference between the entry radiation level and the exit radiation level and determining if the total radiation level exceeds a first alarm threshold level. The method further involves triggering a detection alert if (a) the total radiation level exceeds the first alarm threshold level and (b) the difference is less than a second threshold value.

An apparatus embodiment is also provided for detecting radioactive emissions in a radiation monitoring station. The apparatus has a first radiation detection apparatus configured to acquire a first radiation measurement from a moving radiological source over a first field of view, and a second radiation detection apparatus configured to acquire a second radiation measurement from the moving radiological source over a second field of view. At least a portion of the second field of view is substantially distinct from the first field of view and a transition zone is established between at least a portion of the first field of view and the second field of view. A computational system is provided and configured to calculate a dependent variable that reaches a first threshold value when the radiological source is in the transition zone and to produce an alarm indication if the dependent variable reaches the threshold value.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof and within which are shown by way of illustration specific embodiments by which the invention may be practiced. Described herein are various embodiments of methods and apparatuses for rejecting radioactive interference in a radiation monitoring station. It is to be understood that other embodiments may be utilized, and that structural changes may be made and processes may vary in other embodiments. For example, many embodiments provided herein are described in relation to a personnel radiation monitoring portal. However, the methods and structures also apply to radiation monitoring stations for inspection of a stream of vehicles, shipping containers, packages, luggage, persons, animals, manufactured products, process materials, waste materials, and similar items.

Figure 1:
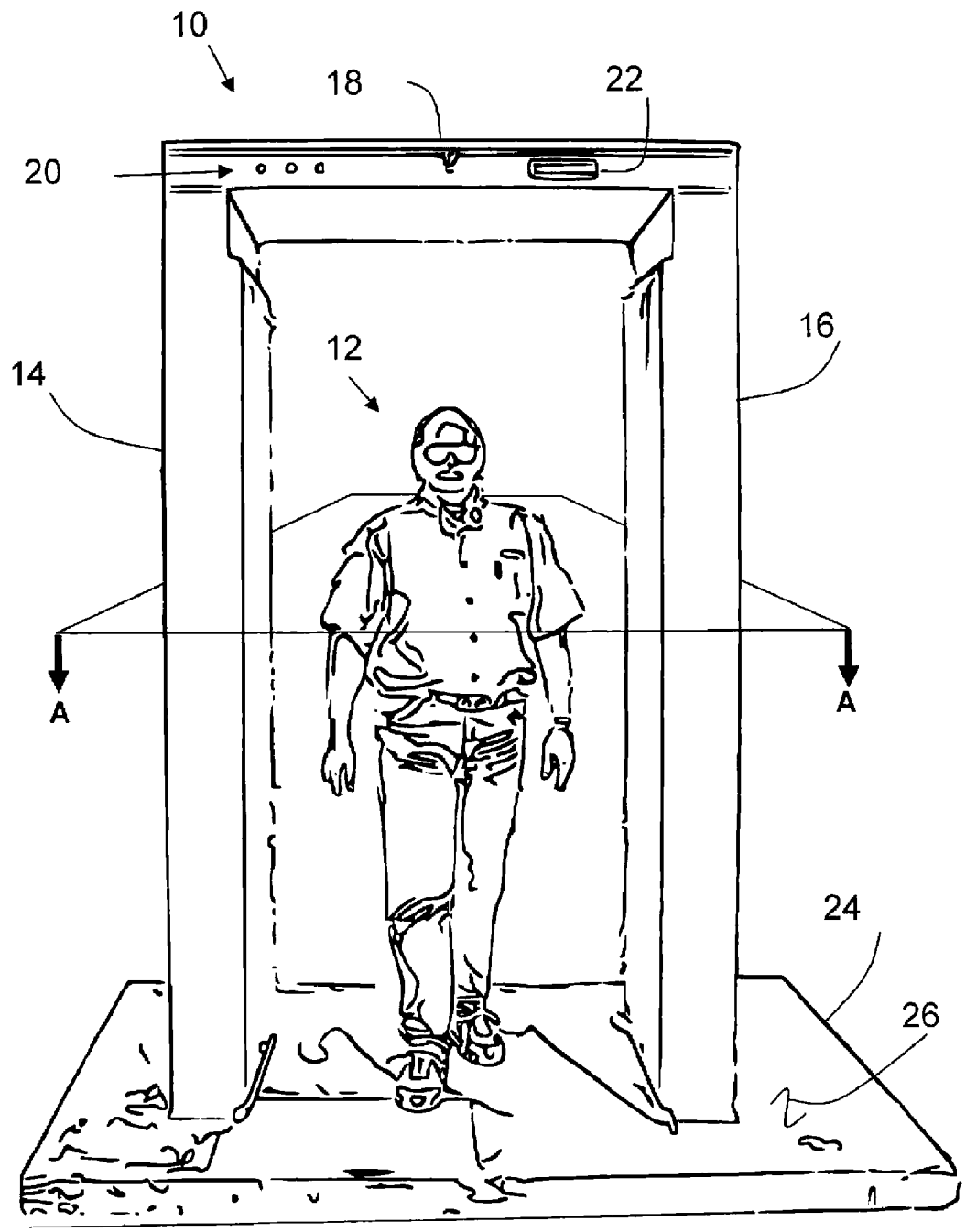
FIG. 1 is a perspective elevation view of a personnel radiation monitoring station.

In one embodiment of a radiation monitoring station illustrated in FIG. 1, a personnel radiation monitoring portal 10 is depicted with a person 12 passing through radiation monitoring portal 10. Radiation monitoring portal 10 includes a first side ("right side," as viewed from the direction of entry) panel 14 and a second ("left side") panel 16. A top-member 18 connects the first (right) side panel 14 and the second (left) side panel 16. Operational status indicators 20 and an alarm indicator 22 may be installed on top-member 18. Often the radiation monitoring portal 10 is mounted on a pedestal 24, and the pedestal top surface 26 of the pedestal 24 may be installed level with the surrounding floor surface. In some embodiments a radiation monitoring station, such as radiation monitoring portal 10, is designed as a portable mobile unit. In such embodiments the pedestal 24 may not be used, or if the pedestal 24 is used, it may be temporarily installed with the pedestal top surface 26 above the surrounding floor surface.

Figure 2A:
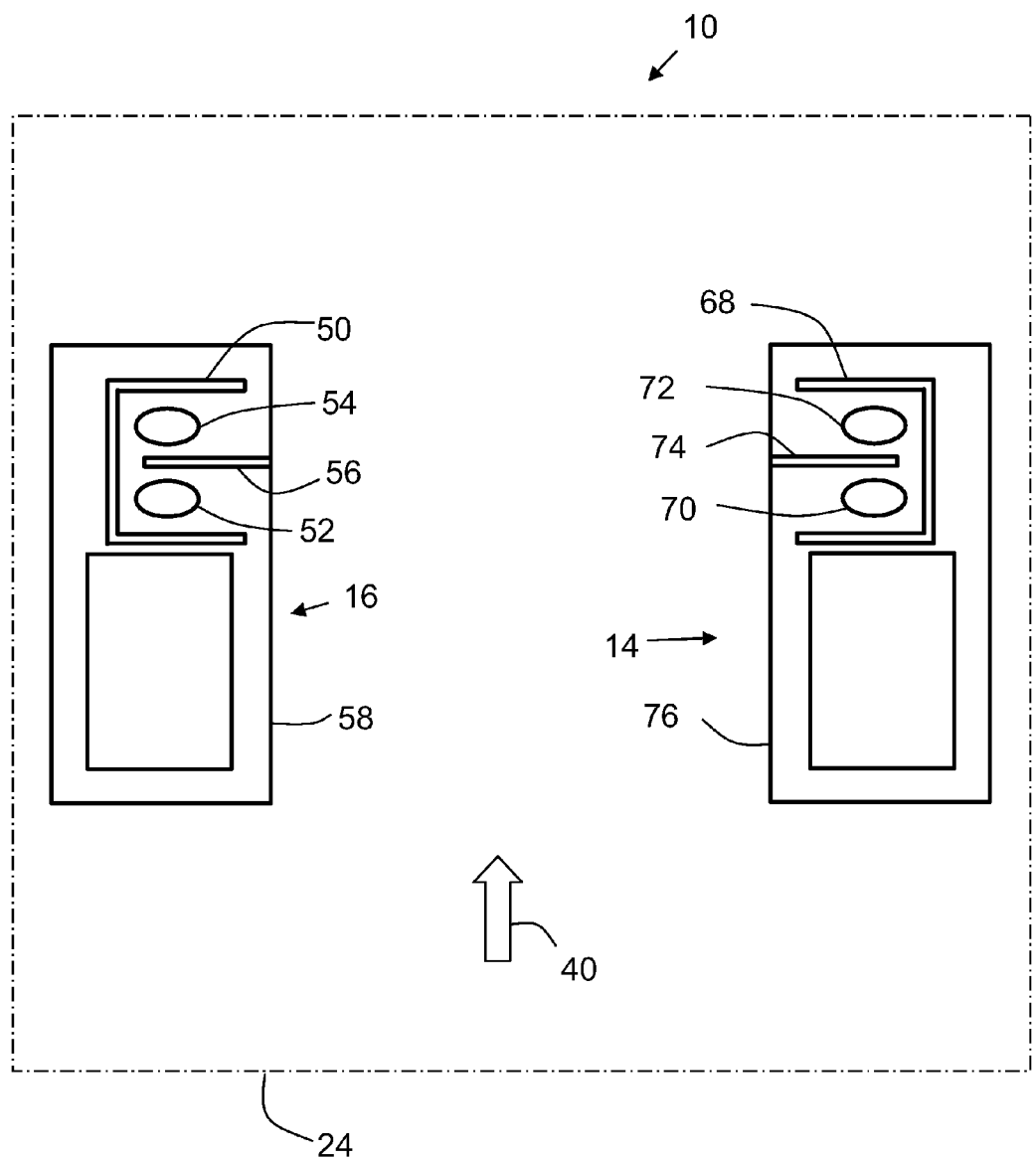
FIG. 2A is a horizontal cross section schematic of a personnel radiation monitoring station through plane A-A of FIG. 1.

FIG. 2A illustrates a schematic horizontal cross-sectional view of radiation monitoring portal 10 through plane A-A of FIG. 1. The direction of passage through the portal is illustrated by arrow 40. This presents a view from the direction opposite that in FIG. 1, so that in FIG. 2A the first (right) side panel 14 is on the right and the second (left) side panel 16 is on the left. Left side panel 16 includes a left side outer radiation shield 50 that partially encloses a first entry gamma radiation detector 52 and a first exit gamma radiation detector 54. The gamma radiation detectors described herein may, for example, be plastic scintillators, NaI(Tl) scintillators. CsI (Na) scintillators, high resolution (e.g., HPGe) detectors, proportional counters. Geiger-Muller detectors, etc. First entry gamma radiation detector 52 and first exit gamma radiation detector 54 are separated by a first radiation separation shield 56. The elements of left side panel 16 are enclosed with a left panel cover 58.

As further illustrated in FIG. 2A, right side panel 14 is, in this embodiment, substantially a mirror image of left side panel 16. Right side panel 14 includes an outer radiation shield 68 that partially surrounds a second entry gamma radiation detector 70 and a second exit gamma radiation detector 72. The second entry gamma radiation detector 70 and the second exit gamma radiation detector 72 are typically the same type of detectors as the first entry gamma radiation detector 52 and the first exit gamma radiation detector 54. Second entry gamma radiation detector 70 and second exit gamma detector 72 are separated by a second radiation separation shield 74. The elements of right side panel 14 are enclosed with a right panel cover 76.

It should be noted that while the radiation monitoring portal 10 is configured to monitor radiation sources moving in the direction of arrow 40, which is the direction that the person 12 of FIG. 1 is walking. Typically radiation monitoring stations are configured in this manner, to monitor radiation sources moving in one direction. However, in some embodiments, by using orthogonal replications of detector sets, a radiation monitoring station may be configured to monitor radiation sources moving in either of two directions orthogonal to each other, or moving in any of three orthogonal directions.

Figure 2B:
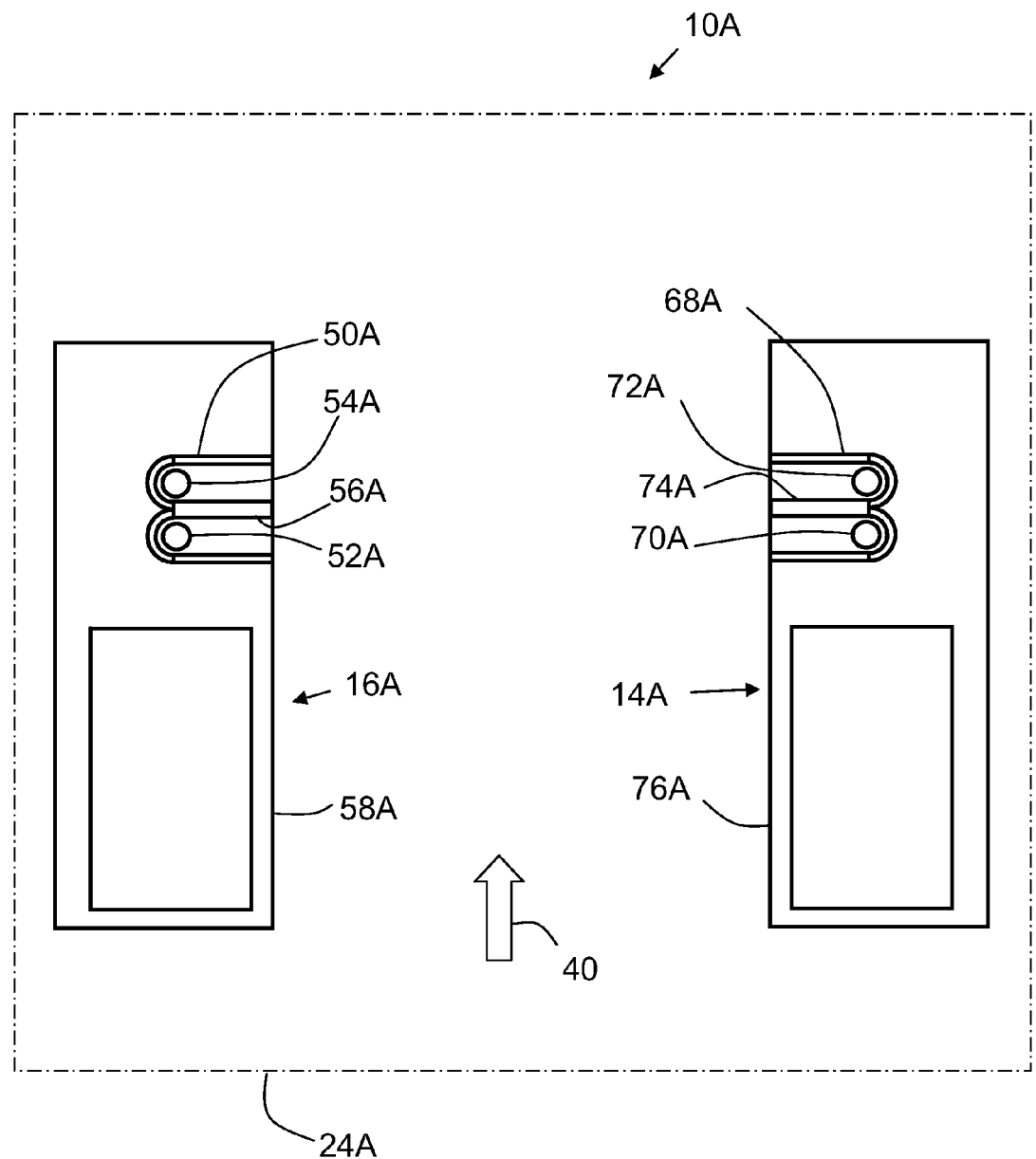
FIG. 2B is a horizontal cross section schematic of an alternative configuration of a personnel radiation monitory station through plane A-A of FIG. 1.

FIG. 2B illustrates a schematic horizontal cross-sectional view of an alternative embodiment radiation monitoring portal 10A through plane A-A of FIG. 1. The direction of passage through the portal is illustrates by arrow 40. This presents a view from the direction opposite that in FIG. 1, so that in FIG. 2B the first (right) side panel 14A is on the right and the second (left) side panel 16A is on the left. Right side panel 14A includes an outer radiation shield 68A that partially surrounds a primary front gamma radiation detector 70A and a second primary back gamma radiation detector 72A. The primary front gamma radiation detector 70A and the primary back gamma radiation detector 72A are typically the same type of detectors as the first entry gamma radiation detector 52A and the first exit gamma radiation detector 54A. The primary front entry gamma radiation detector 70A and primary back gamma detector 72A are separated by a first radiation separation shield 74A that is a different configuration than first radiation separation shield 56 depicted in FIG. 2A. The elements of right side panel 14A are enclosed with a right panel cover 76A.

As illustrated further in FIG. 2B, left side panel 16A is, in this embodiment, substantially a mirror image of left side panel 14A. Left side panel 16A includes a left side outer radiation shield 50A that partially encloses a secondary front gamma radiation detector 52A and a secondary back gamma radiation detector 54A. Secondary front gamma radiation detector 52A and secondary back gamma radiation detector 54A are separated by a second radiation separation shield 56A. The elements of left side panel 16A are enclosed with a left panel cover 58A.

Figure 2C:
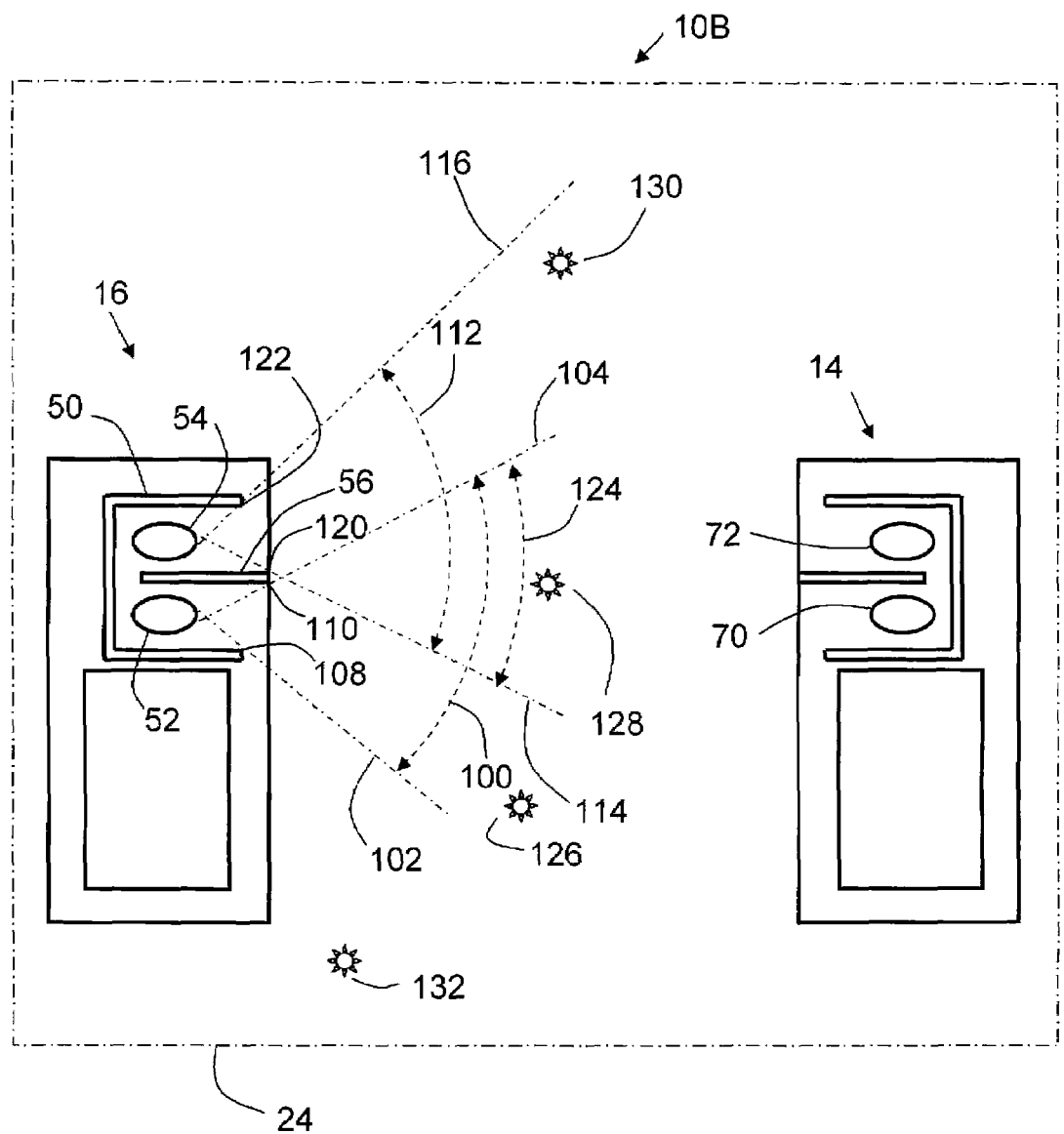
FIG. 2C adds certain radiation detection viewing angle information to the schematic cross-section of FIG. 2A.

FIG. 2C illustrates certain "viewing angles" seen by the first entry gamma radiation detector 52 and the first exit gamma radiation detector 54 in this embodiment. A viewing angle is a spatial region defined by at least two lines within which a detector is capable of detecting a radiological source. For example, a first entry gamma radiation detection viewing angle 100 for first entry gamma radiation detector 52 is defined by lines 102 and 104. Line 102 is defined by the edge of first entry gamma radiation detector 52 and a corner 108 of left side outer radiation shield 50. Line 104 is defined by the edge of first entry gamma radiation detector 52 and a first corner 110 of the first radiation separation shield 56.

A first exit gamma radiation detection viewing angle 112 for first exit gamma radiation detector 54 is defined by lines 114 and 116. Line 114 is defined by the edge of first exit gamma radiation detector 54 and a second corner 120 of the first radiation separation shield 56. Line 116 is defined by the edge of first exit gamma radiation detector 54 and a corner 122 of left side panel outer radiation shield 50.

Viewing angles seen by the second entry gamma radiation detector 70 and the second exit gamma radiation detector 72 are analogous to first entry gamma radiation detection viewing angle 100 seen by first entry gamma radiation detector 52 and first exit gamma radiation detection viewing angle 112 seen by first exit gamma radiation detector 54, respectively.

The first entry gamma radiation detector 52 is an example of a first radiation detection apparatus positioned to acquire a first radiation measurement from a moving radiological source over a first field of view in a radiation monitoring station. The first exit gamma radiation detector 54 is an example of a second radiation detection apparatus positioned to acquire a second radiation measurement from the moving radiological source over a second field of view in the radiation monitoring station. In alternative embodiments other radiation detectors, such as neutron detectors, may be used as a first radiation detection apparatus and as a second radiation detection apparatus.

In the embodiment of FIG. 2C first entry gamma radiation detection viewing angle 100 overlaps first exit gamma radiation detection viewing angle 112 by overlap angle 124. Overlap angle 124 is considered to be an overlap transition zone between (a) a first field of view (e.g., first entry gamma radiation detection viewing angle 100) and (b) a second field of view (e.g., first exit gamma radiation detection viewing angle 112). In some embodiments there is no overlap between the first and second gamma radiation detection angles. That is, there is a gap between the first field of view and the second field of view. In embodiments where there is no overlap between the first field of view and the second field of view the space between the first field of view and the second field of view is considered to be a gap transition zone. An "overlap transition zone" and a "gap transition zone" each represent an example of a "transition zone."

In some embodiments the overlap angle (e.g., overlap angle 124) in FIG. 2C is less than approximately one half, or one third, or one quarter of the smaller of (a) the angle of the first field of view (e.g., first entry gamma radiation detection viewing angle 100) or (b) the angle of the second field of view (e.g., first exit gamma radiation detection viewing angle 112). In embodiments where the overlap angle is less than approximately ninety percent of the smaller of (a) the angle of the first field of view and (b) the angle of the second field of view, at least a portion of the second field of view is considered to be "substantially distinct" from the first field of view. Preferably the overlap angle is less than approximately one tenth of the smaller of (a) the angle of the first field of view and (b) the angle of the second field of view, and most preferably the overlap angle is substantially zero.

In the embodiment illustrated in FIG. 2C, assuming adequate detector sensitivity, a radiological source in a position 126 will be detected by first entry gamma radiation detector 52 because a radiological source in position 126 is within first entry gamma radiation detection angle 100. Assuming the adequate shielding ability of the first radiation separation shield 56, a radiological source in the position 126 will be not be detected by first exit gamma radiation detector 54 because a radiological source in the position 126 is not within the first exit gamma radiation detection angle 112.

Again, assuming adequate detector sensitivity, a radiological source in a position 128 (i.e. in an overlap transition zone) will be detected by the first entry gamma radiation detector 52 because a radiological source in position 128 is within the first entry gamma radiation detection angle 100, and a radiological source in the position 128 will be detected by the first exit gamma radiation detector 54 because a radiological source in the position 128 is within the first exit gamma radiation detection angle 112.

In alternative embodiments where a radiological source in position 128 is in a gap transition zone between a first field of view and a second field of view, the radiological source will not be detected by either the first radiation detection apparatus or the second radiation detection apparatus.

A radiological source in position 130 will not be detected by the first entry gamma radiation detector 52 because a radiological source in position 130 is outside first entry gamma radiation detection angle 100, and a radiological source in the position 130 will be detected by the first exit gamma radiation detector 54 because a radiological source in the position 130 is within the first exit gamma radiation detection angle 112.

A radiological source in position 132 will not be detected by the first entry gamma radiation detector 52 because a radiological source in position 132 is outside first entry gamma radiation detection angle 100, and a radiological source in the position 132 will not be detected by the first exit gamma radiation detector 54 because a radiological source in the position 132 is outside the first exit gamma radiation detection angle 112.

It is to be further understood that radiation detectors typically measure the intensity of radiation and radiation intensity diminishes substantially as a function of the square of the distance between the radiological source and the detector.

Figure 3:
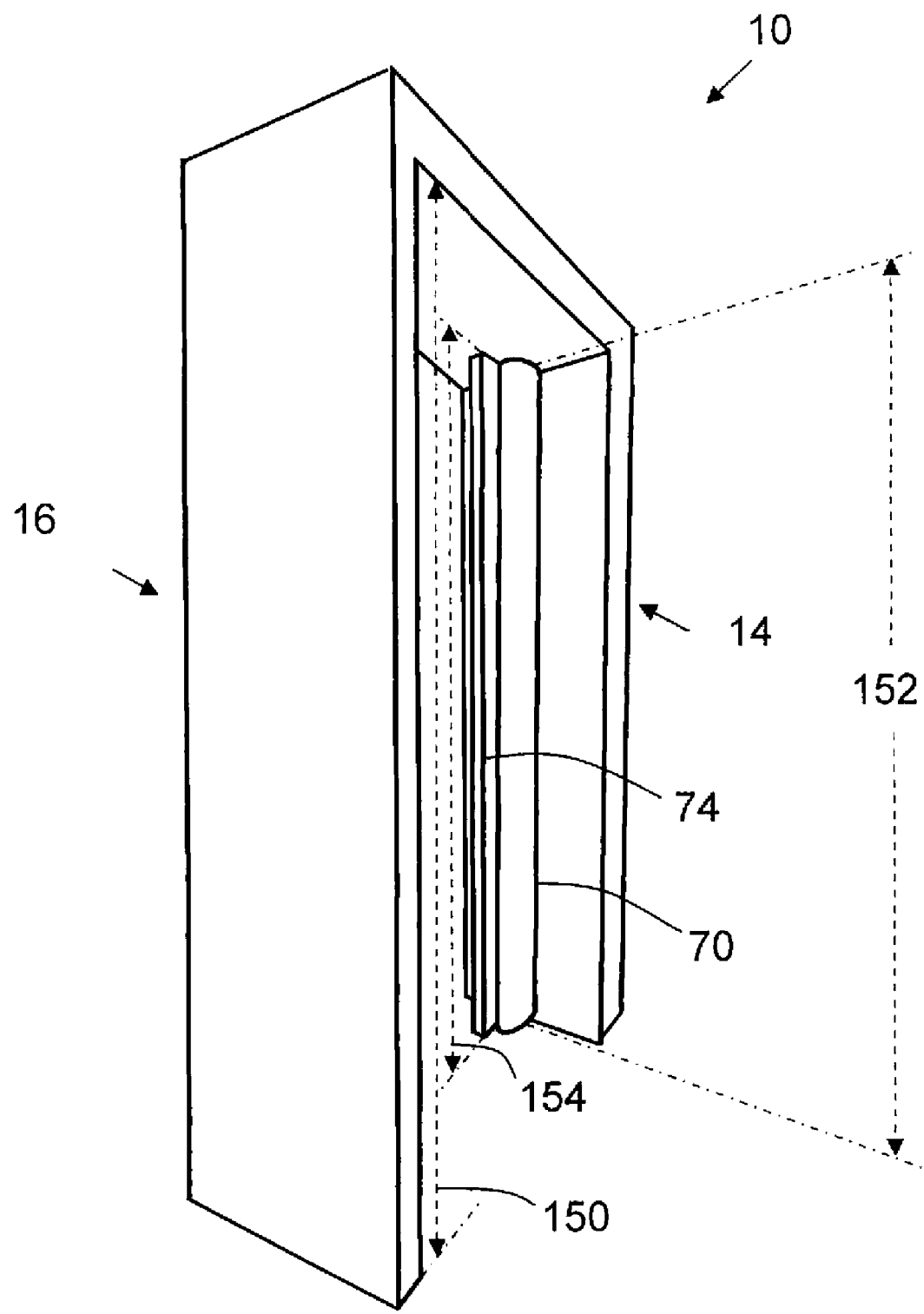
FIG. 3 is a perspective elevation schematic of the personnel radiation monitoring station of FIGS. 1 and 2A and 2C.

FIG. 3 illustrates a perspective schematic elevation view of the radiation monitoring portal 10 with the left panel cover 58 and the right panel cover 76 (each identified in FIG. 2A) both being removed. The right side panel 14 and left side panel 16 have a panel height 150. Furthermore in this embodiments although only the second entry gamma radiation detector 70 is visible, the height of the first entry gamma radiation detector 52 and the first exit gamma radiation detector 54 and the second entry gamma radiation detector 70 and the second exit gamma radiation detector 72 all have a detector height 152, and the detector height 152 is substantially equal to the panel height 150. Also, although only the second radiation separation shield 74 is visible, the first radiation separation shield 56 and the second radiation separation shield 74 have a separation shield height 154, and the separation shield height 154 is substantially equal to the panel height 150. In some embodiments the detector height 152 may be only a fraction of the panel height 150. In embodiments where the detector height 152 is a fraction of the panel height 150 the detectors are generally located approximately in the middle of the panel height 150. In most embodiments the separation shield height 154 is substantially equal to the detector height 152 and the separation shield is located at the same elevation as the entry and the exit detectors.

Table 1 presents example count rates from a simulated PVT neutron detector in a radiation monitoring portal.

TABLE 1

| position | PVT count rates | |
| --- | --- | --- |
| | entry | exit |
| −1000 | 1.79E+04 | 5.36E+03 |
| −500 | 9.09E+04 | 2.82E+04 |
| −300 | 3.23E+05 | 7.46E+04 |
| −250 | 5.25E+05 | 1.07E+05 |
| −200 | 9.17E+05 | 1.63E+05 |
| −150 | 1.73E+06 | 2.66E+05 |
| −100 | 3.26E+06 | 5.67E+05 |
| −75 | 4.28E+06 | 1.21E+06 |
| −50 | 6.14E+06 | 2.43E+06 |
| −25 | 6.22E+06 | 4.28E+06 |
| 0 | 6.11E+06 | 6.14E+06 |
| 25 | 4.28E+06 | 6.22E+06 |
| 50 | 2.43E+06 | 6.14E+06 |
| 75 | 1.21E+06 | 4.28E+06 |
| 100 | 5.67E+05 | 3.26E+06 |
| 150 | 2.66E+05 | 1.73E+06 |
| 200 | 1.63E+05 | 9.17E+05 |
| 250 | 1.07E+05 | 5.25E+05 |
| 300 | 7.46E+04 | 3.23E+05 |
| 500 | 2.82E+04 | 9.09E+04 |
| 1000 | 5.36E+03 | 1.79E+04 |

Figure 4:
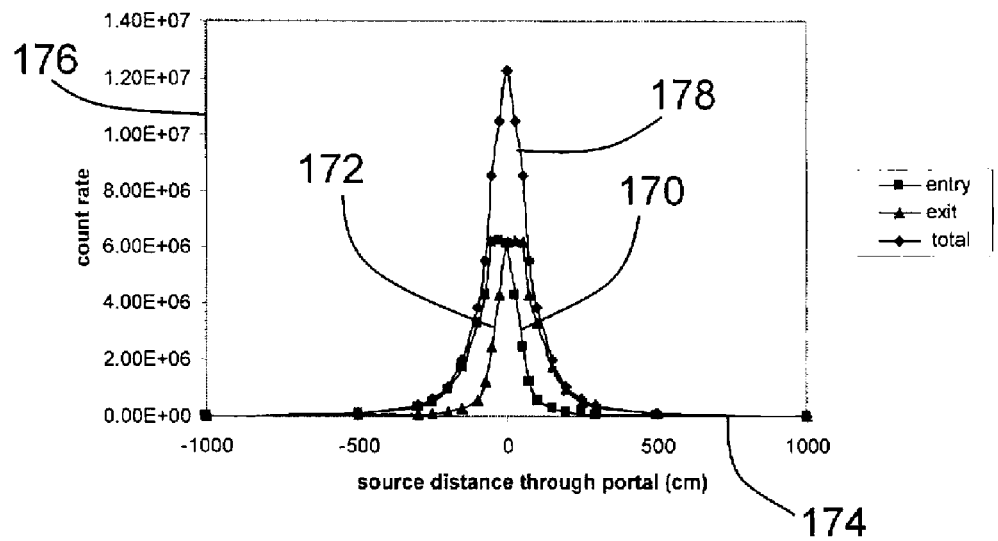
FIG. 4 is a graph depicting entry detector counts exit detector counts and combined total detector counts as a hypothetical radiological source moves through a radiation monitoring station.

FIG. 4 illustrates plots using the radiation counts of Table 1. Shown in FIG. 4 is a plot of entry radiation count rates 170 from a radiological source detected by the first entry gamma radiation detector 52. First entry gamma radiation detector 52 is an example of a first radiation detection apparatus positioned to acquire a first radiation measurement from a moving radiological source over a first field of views in a radiation monitoring station. FIG. 4 further illustrates a plot of exit radiation count rates 172 detected by the first exit gamma radiation detector 54. First exit gamma radiation detector 54 is an example of a second radiation detection apparatus to acquire a second radiation measurement from the moving radiological source over a second field of view in a radiation monitoring station.

Distances along the X-axis 174 in FIG. 4 represent displacement of the radiological source from a position "0" or the "portal midline," (e.g., position 128 illustrated in FIG. 2B). Entry radiation count rates 170, quantified on Y-axis 176, rise as the radiological source approaches position 0 and then rapidly fall off as the radiological source moves through the transition zone represented by overlap angle 124 depicted in FIG. 2B. Exit radiation count rates 172 rise rapidly as the radiological source reaches the transition zone represented by overlap angle 124 and then fall off as the distance of the radiological source from position 0 increases. A plot of the sum 178 of the entry radiation count rates 170 and the exit radiation count rates 172 is also presented in FIG. 4.

Table 2 presents calculated diff/total values calculated from the count values of Table 1.

TABLE 2

| | PVT detector model count rates | | |
| --- | --- | --- | --- |
| position | entry | exit | (diff./total) |
| −1000 | 17945.85 | 5356.971 | −0.54023 |
| −500 | 90854.23 | 28213.38 | −0.52609 |
| −300 | 323471.8 | 74640.46 | −0.62503 |
| −250 | 525460.5 | 107377.5 | −0.66065 |
| −200 | 917350.3 | 162971.1 | −0.69829 |
| −150 | 1730837 | 265884.3 | −0.73368 |
| −100 | 3258110 | 567303.2 | −0.7034 |
| −75 | 4277184 | 1209425 | −0.55914 |
| −50 | 6144446 | 2427422 | −0.43363 |
| −25 | 6217658 | 4280756 | −0.18449 |
| 0 | 6108197 | 6144446 | 0.002958 |
| 25 | 4280756 | 6217658 | 0.184495 |
| 50 | 2427422 | 6144446 | 0.433631 |
| 75 | 1209425 | 4277184 | 0.559136 |
| 100 | 567303.2 | 3258110 | 0.703403 |
| 150 | 265884.3 | 1730837 | 0.733679 |
| 200 | 162971.1 | 917350.3 | 0.698291 |
| 250 | 107377.5 | 525460.5 | 0.660648 |
| 300 | 74640.46 | 323471.8 | 0.625028 |
| 500 | 28213.38 | 90854.23 | 0.526095 |
| 1000 | 5356.971 | 17945.85 | 0.54023 |

Figure 5:
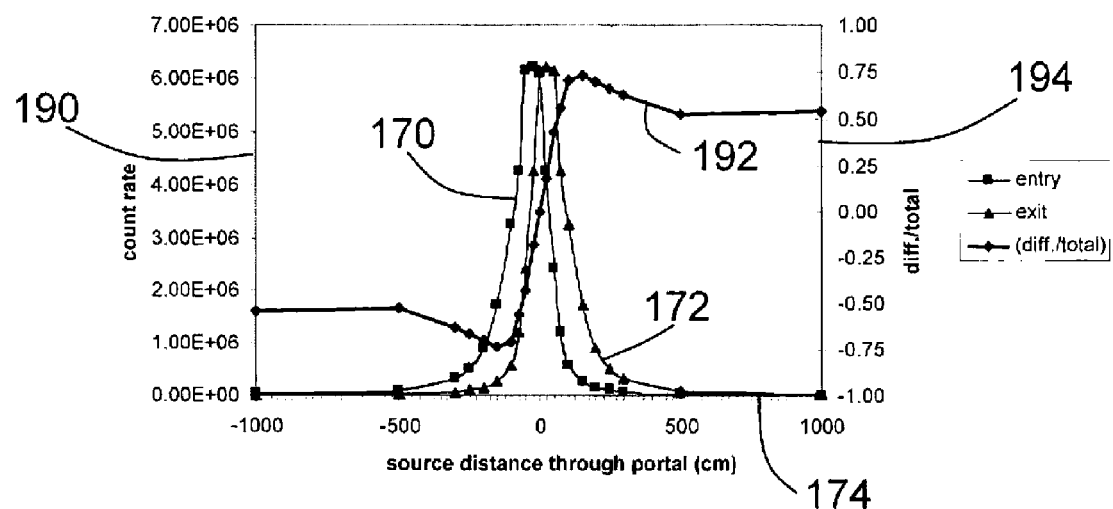
FIG. 5 is a graph depicting entry detector counts, exit detector counts, and a relative difference calculation as a hypothetical radiological source moves over a short range through a radiation monitoring station.

FIG. 5 repeats the plots of the entry radiation count rates 170 and the exit radiation count rates 172 show, in FIG. 4 on a magnified left Y-axis 190. Also plotted in FIG. 5 is a relative difference calculation 192 (from Table 2) quantified on the right Y-axis 194. The relative difference calculation is defined by Equation 1.

$$\text{relative difference} = \frac{(\text{entry panel count rate}) - (\text{exit panel count rate})}{[(\text{entry panel count rate}) + (\text{exit panel count rate}) - (\text{background rate})]} \quad (\text{Eq'n 1})$$

The background rate is the sum of the 'entry' and 'exit' panel count rates when the portal is empty and no sources are nearby, as represented by Equation 2.

$$\text{background rate} = (\text{entry panel rate})_{background} + (\text{exit panel rate})_{background} \quad (\text{Eq'n 2})$$

In some embodiments a relative difference calculation does not include the background rate (i.e., the background rate is assumed to be zero). For example, the background rate is assumed to be zero in the relative difference calculation 192 of FIG. 5. Equation 1 is an example of calculating a percentage difference between the entry radiation level and the exit radiation level.

Equation 1, with the background rate calculated as defined in Equation 2, is an example of a function yielding a dependent variable (i.e., "relative difference" calculation 192) where the function is defined at least in part by a first radiation level measurement (i.e., entry panel count rate 170) and a second radiation level measurement (i.e., exit panel count rate 172) and the dependent variable reaches a first threshold value (in this case, zero) when the moving radiological source moves through the transition zone (in this case the portal midline, or 0 on the X-axis of FIG. 5). In some embodiments the first threshold value may be defined in terms of a "limit value," meaning (as used herein) a value of zero or one. Equation 2 is also an example of a function yielding a dependent variable that includes a calculation of ratios involving a first radiation measurement and a second radiation measurement to yield the dependent variable.

Continuing with FIG. 5, note the steep change in relative difference from about ±100 cm from the portal midline (0 on the X-axis). This illustrates that if a trigger detection alert is set when the two detectors have a relative difference of less than approximately 10% of the maximum relative difference measured in a radiation monitoring portal as a radiological source passes through the portal it is expected that the detected radiological source is within 10 cm of the portal midline. A calculation of a percentage of the maximum relative difference is a further example of calculating a percentage difference between the entry radiation level and the exit radiation level. Calculating a percentage difference between the entry radiation level and the exit radiation level involves dividing a first function including the entry radiation level and/or the exit radiation level by a second function including the entry radiation level and/or the exit radiation level.

A variation of this method and a particular apparatus may be used when there is a "large" gamma source near the portal that may impair the effectiveness of the 'relative difference' system. This situation occurs when a person who has recently received $^{99m}$Tc or $^{131}$I medical treatments approaches one side of the portal. Experience has shown that such a person at the rear of a queue of 5-20 people can significantly change the portal response. This situation causes three separate phenomena. First, radiation from the 'large' source is scattered by any person, object, etc. entering the portal, causing an increase in detected count rates and giving the appearance that there is an actual radiation source passing through the portal when there is no source present. This is called 'backscattered radiation'. Second, count rate levels in 'entry', 'exit' or both detectors increase due to the higher radiation levels caused by the large source. The source increases the count rate in the 'entry' and 'exit' detectors but causes a larger increase in the 'entry' detectors vs. the exit detectors when the source is closer to the portal entry or an increase in the 'exit' detectors vs. the 'entry' detectors when the source is closer to the portal exit. This effect occurs whether the portal is occupied or not. This count rate increase generally persists for longer periods relative to the time required for a person to walk through the portal. Third, a person, object, etc. may momentarily shield the one or more detectors from radiation emitted by the 'large' source. This effect is completely random in real situations. A similar phenomenon called 'baseline depression' has been observed in portals used to examine vehicles where large trucks reduce detector count rates by shielding the detectors from surrounding natural background radiation.

Table 3 presents simulated data from a radiation monitoring portal where a 'large' source such as a person who has recently received $^{99m}$Tc or $^{131}$I medical treatments approaches one side of the portal.

TABLE 3

| | entry side bias | | 1.00E+06 |
|---|---|---|---|
| position | entry rate | exit rate | [diff./total] |
| −1000 | 1.02E+06 | 5.36E+03 | 9.90E−01 |
| −500 | 1.09E+06 | 2.82E+04 | 9.50E−01 |
| −300 | 1.32E+06 | 7.46E+04 | 8.93E−01 |
| −250 | 1.53E+06 | 1.07E+05 | 8.68E−01 |
| −200 | 1.92E+06 | 1.63E+05 | 8.43E−01 |
| −150 | 2.73E+06 | 2.66E+05 | 8.23E−01 |
| −100 | 4.26E+06 | 5.67E+05 | 7.65E−01 |
| −75 | 5.28E+06 | 1.21E+06 | 6.27E−01 |
| −50 | 7.14E+06 | 2.43E+06 | 4.93E−01 |
| −25 | 7.22E+06 | 4.28E+06 | 2.55E−01 |
| 0 | 7.11E+06 | 6.14E+06 | 7.27E−02 |
| 25 | 5.28E+06 | 6.22E+06 | −8.15E−02 |
| 50 | 3.43E+06 | 6.14E+06 | −2.84E−01 |
| 75 | 2.21E+06 | 4.28E+06 | −3.19E−01 |
| 100 | 1.57E+06 | 3.26E+06 | −3.50E−01 |
| 150 | 1.27E+06 | 1.73E+06 | −1.55E−01 |
| 200 | 1.16E+06 | 9.17E+05 | 1.18E−01 |
| 250 | 1.11E+06 | 5.25E+05 | 3.56E−01 |
| 300 | 1.07E+06 | 3.23E+05 | 5.37E−01 |
| 500 | 1.03E+06 | 9.09E+04 | 8.38E−01 |
| 1000 | 1.01E+06 | 1.79E+04 | 9.65E−01 |

Figure 6:
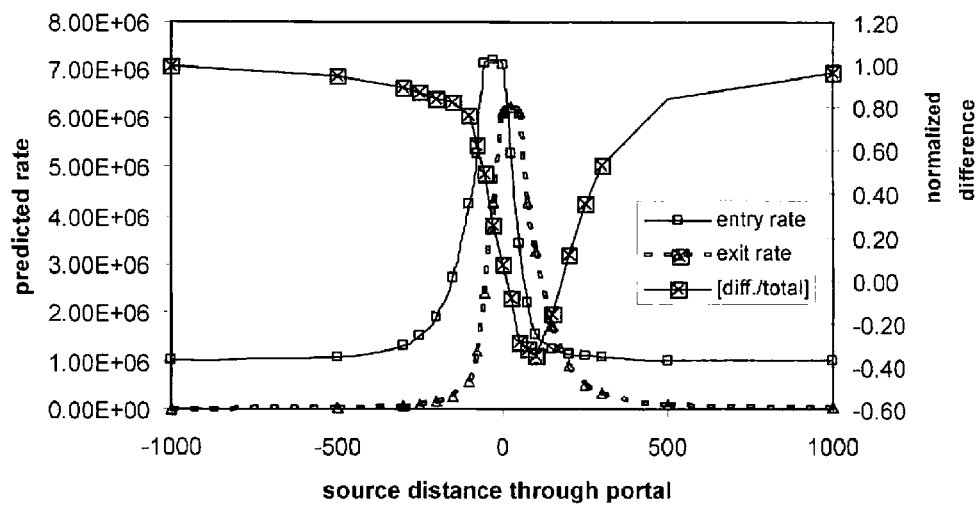
FIG. 6 is a graph depicting entry detector counts, exit detector counts, and a relative difference calculation as a hypothetical "large" radiological source approaches one side of a radiation monitoring station.

FIG. 6 illustrates that when the person is near the portal entry, he/she causes an increase in count rate. In this case, the portal would sense that the total rate is above a threshold level. An 'Alert' indicator is set, typically an indicator on the portal and a flag in the data is output to remote site(s).

An alternative method may be used to address these effects. In the alternative method, measurements in the portal consist of a series of count rates measured during successive time intervals (typically 0.2-1.0 seconds). Baseline count rate levels are established using data from the 'long' time constant filter applied to the data while 'sources' moving through the portal are sensed by applying a 'short' time constant filter to the same data. Since there is usually only a single 'large' source near the portal. differences in the 'entry' count rates filtered using the 'long' time constant filter and 'exit' count rates filtered using the 'short' time constant filter can be used to discriminate between nearby sources and sources actually passing through the portal.

The preferred apparatus for use with this alternative method is the radiation monitoring portal 10A of FIG. 2B. For the following calculations the primary front gamma radiation detector 70A is referred to as "P1" and the second primary back gamma radiation detector 72A is referred to as "P2." Further, the secondary front gamma radiation detector 52A is referred to as "S1" and the secondary back gamma radiation detector 54A is referred to as "S2." As used herein, references to "front" and "entry" are synonymous and references to "exit" and "back" are synonymous.

Count rates from individual detectors: $S1_i$, $S2_i$, $P1_i$, $P2_i$ are measured at Tp intervals, counted over T1 time intervals. Subscripts refer to the i-th measured count rate value. The sums of front and back detector count rates are given by:

$$B1_i = S1_i + P1_i \text{ and} \qquad\qquad\text{(Eq'n 3a)}$$

$$B2_i = S2_i + P2_i \qquad\qquad\text{(Eq'n 3b)}$$

where "B" refers to both sides.

Up to five inputs of front-back pairs of data may be defined:
P2$_i$ (back) and P1$_i$ (front) (Input Pair 1)
S2$_i$ (back) and S1$_i$ (front) (Input Pair 2)
S1$_i$ (front) and P2$_i$ (back) (Input Pair 3)
P1$_i$ (front) and S2$_i$ (back) (Input Pair 4)
B2$_i$ (back) and B1$_i$ (front) (Input Pair 5)

An alarm algorithm is typically applied to each of the five pairs of data—five tests for alarm generation. However, in some embodiments only one or two pairs of front and back data are tested, and in some embodiments only the "both sides" (Input Pair 5) values are used. The algorithm is described as follows for one pair of front-back count rates: Front$_i$ and Back$_i$, but again, the algorithm may be applied to each pair of data in five (or less) separate alarm determinations.

Determine if there is a statistically significant difference between Front and Back. that is, if the D$_i$ calculated below is statistically significant:

$$D_i \geq (\sqrt{\text{Front}_i} + \sqrt{\text{Back}_i}) \quad \text{(Eq'n 4)}$$

If D is not statistically significant for at least one input pair, use the relative difference algorithm for alarm tests.
Calculate the threshold for alarms.
  a. Compute the recursive filtered difference between front and back count rates:

$$D_i = (1-a) \cdot D_{i-1} + a \cdot (\text{Back}_i - \text{Front}_i) \quad \text{(Eq'n 5)}$$

(At the start, D$_j$=(Back$_j$−Front$_j$)
  Set parameter a to make the filter work with normal pedestrian speeds; it is generally acceptable to use a=0.01 as a starting value.
  b. Alarm Threshold $$\text{Threshold}_i = D_i + b \cdot (\sqrt{\text{Front}_i} + \sqrt{\text{Back}_i}) \quad \text{(Eq'n 6)}$$

Parameter b represents the 'n·σ' statistical noise above the averaged difference between front and back (difference due to large medical source nearby). Using b=6 for starting is generally acceptable.
  Calculate the front rate difference:

$$R_i = \text{Back}_i - (\text{Filtered Front})_i, \text{ where}$$

(Eq'n 7)

$$(\text{Filtered front})_i = (1-a) \cdot (\text{Filtered front})_{i-1} + a \cdot \text{Front}_i \quad \text{(Eq'n 8)}$$

Alarm if $$R_i > \text{Threshold}_i \quad \text{(Eq'n 9)}$$

Equation 8 is an example of a recursive filter. A recursive filter is an example of a time averaging filter. The recursive filter is easy to implement and does not require 'look ahead' values to average. The filter applied to a series of C$_i$ count rates is:

$$(\text{Filtered } C)_i = (1-a) \cdot (\text{Filtered } C)_{i-1} + a \cdot C_i \quad \text{(Eq'n 10)}$$

Equation 8 is a further example of a function yielding a dependent variable (TRUE or FALSE) that is defined at least in part by a first radiation level measurement and a second radiation level measurement.

Using a preferred embodiment, the asymptotic behavior of relative differences was calculated using a computer model evaluating source material moving to and from 0 to 100 m from the portal center. A ~10 mCi $^{131}$I medical radioisotope source causes a small count rate increase at 100 m. It was determined that such large distances the relative difference (Equation 1) remains above 0.25 and the percentage difference (Equation 3) remains above ~20%. The relative difference values are presented in Table 4.

TABLE 4

| | count rates | | |
|---|---|---|---|
| position | entry | exit | (diff./total) |
| −10000 | 114.2556 | 0 | −1 |
| −3000 | 2665.965 | 799.7894 | −0.53846 |
| −1000 | 35800.1 | 17062.17 | −0.35447 |
| −500 | 181590.3 | 66420.61 | −0.46437 |
| −300 | 557853.1 | 179000.5 | −0.51415 |
| −250 | 839398 | 260502.8 | −0.52632 |
| −200 | 1309496 | 395070.4 | −0.53646 |
| −150 | 2268355 | 630119.8 | −0.56521 |
| −100 | 4044268 | 1070385 | −0.58144 |
| −75 | 5220721 | 1873602 | −0.4718 |
| −50 | 6479627 | 3190588 | −0.34012 |
| −25 | 7254471 | 5219959 | −0.16309 |
| 0 | 7138501 | 7154116 | 0.001093 |
| 25 | 5219959 | 7254471 | 0.163095 |
| 50 | 3190588 | 6479627 | 0.340121 |
| 75 | 1873602 | 5220721 | 0.471802 |
| 100 | 1070385 | 4044268 | 0.581444 |
| 150 | 630119.8 | 2268355 | 0.565206 |
| 200 | 395070.4 | 1309496 | 0.536456 |
| 250 | 260502.8 | 839398 | 0.526316 |
| 300 | 179000.5 | 557853.1 | 0.514149 |
| 500 | 66420.61 | 181590.3 | 0.464373 |
| 1000 | 17062.17 | 35800.1 | 0.354467 |
| 3000 | 799.7894 | 2665.965 | 0.538462 |
| 10000 | 0 | 114.2556 | 1 |

Figure 7:
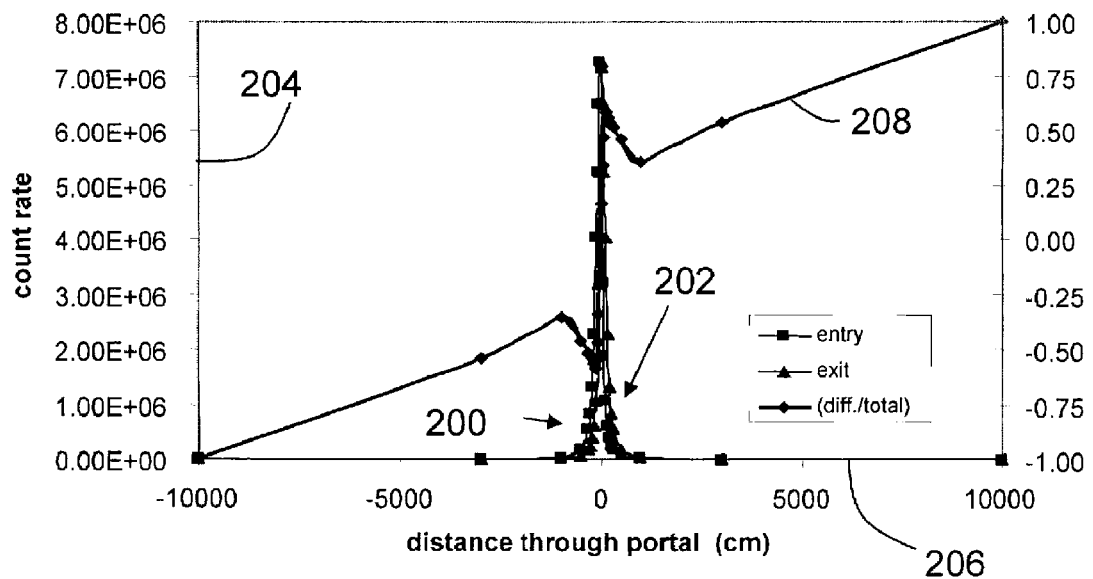
FIG. 7 is a graph depicting entry detector counts, exit detector counts, and a relative difference calculation as a hypothetical radiological source moves over a long range through a radiation monitoring station.

In FIG. 7 Entry gamma radiation detector count rates 200 and exit gamma radiation detector count rates 202 Count rates are plotted on the Y-axis 204 as a function of distance through the portal plotted on X-Axis 206. The relative difference calculations are shown as plot 208.

Figure 8:
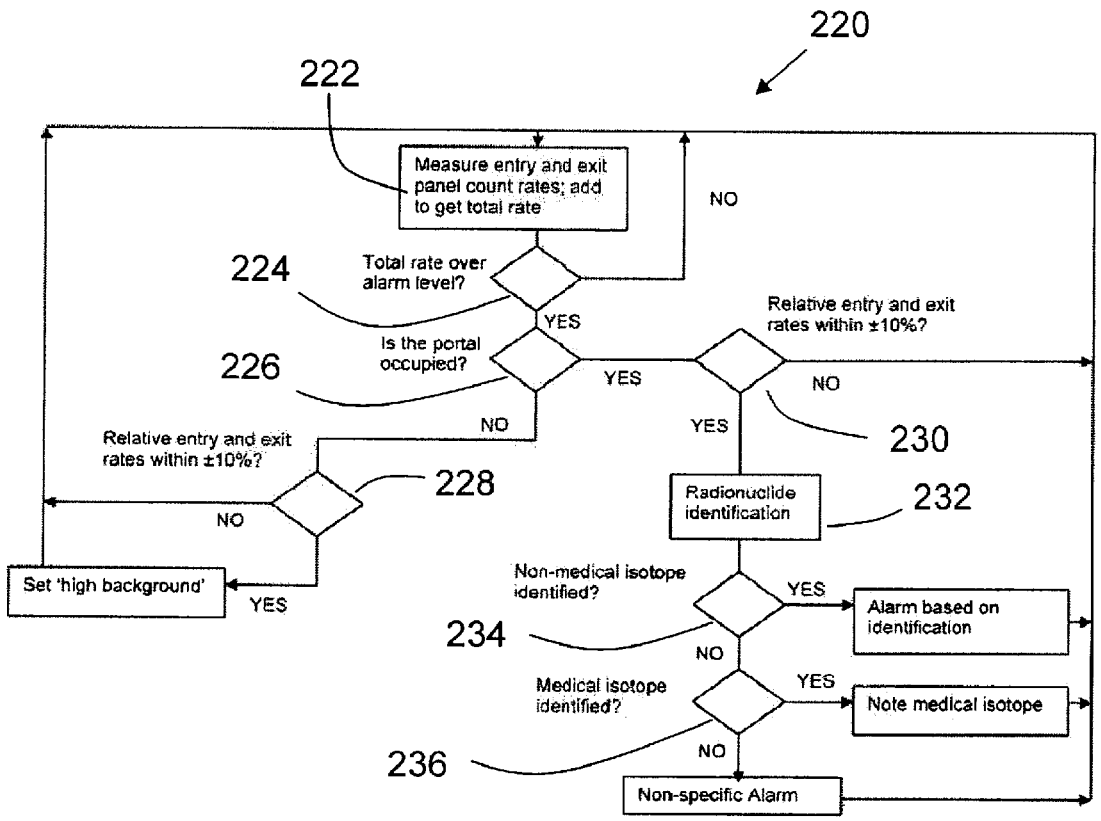
FIG. 8 is flow chart depicting a method for rejecting radioactive interference in a radiation monitoring station.

FIG. 8 illustrates a flow chart 220 for an embodiment of a method for rejecting radioactive interference in a radiation monitoring station. This method incorporates some of the elements previously described as well as some additional elements. In step 222 of the method depicted in flow chart 220, the entry and exit panel count rates are measured and added together to get a total count rate. In decision point 224 a determination is made as to whether the total count rate exceeds a threshold alarm level. If the total count rate at decision point 224 does not exceed a threshold alarm level the analysis returns to step 222. If the total count rate at decision point 224 does exceed a threshold alarm level then the analysis proceeds to decision point 226.

At decision point 226 it is determined whether the portal is occupied. If the portal is not occupied it is either too early or too late to trigger a detection alert. If the portal is not occupied the analysis proceeds to decision point 228 where a determination is made as to whether the entry panel count rate and the exit panel count rate are within ±10%. If the entry panel count rate and the exit panel count rate are within ±10%, a "high background" measurement is set. A "high background" setting may be used to initiate a alternative method of detection as previously described herein.

Returning to decision point 226 in FIG. 8, if the total count rate at decision point 224 exceeded a threshold alarm level and (per decision point 226) the portal is occupied, the analysis proceeds to decision point 230. At decision point 230 a determination is made as to whether the entry panel count rate and the exit panel count rate are within ±10%. If the entry panel count rate and the exit panel count rate are not within ±10% the analysis returns to step 222. If the entry panel count rate and the exit panel count rate are within ±10%, a radionuclide identification procedure 232 is invoked. Typically, procedure 232 involves an estimation as to whether the likelihood of presence of a medical isotope is less than a threshold value.

Then at decision point 234, if in procedure 232 a non-medical isotope was determined to be not likely and an offensive radionuclide was identified, an alarm (detection alert) is generated and the identity of the offensive radionuclide identified in procedure 232 is provided. If at decision point 234 a medical isotope is identified as the likely radiological source, the detection of the medical isotope is noted and logged. If at decision point 236 a medical isotope was not identified in procedure 232 and an offensive radionuclide was not identified either, the analysis generates a non-specific alarm (detection alert) because a potentially offensive radiological source was identified in procedure 232 by the radiation monitoring station, but the nature of the radionuclide was not determined.

In some embodiments, alternative or additional detection methods using relative differences may be applied when persons or items are moving through a radiation monitoring station at approximately a constant known speed, such as on a conveyer. Such methods utilize correlation techniques to determine whether the shape of a measured radiation count curve correlates with a predicted radiation count curve. Example simulated data are presented in Table 5.

TABLE 5

| speed | | |
|---|---|---|
| | | 5 mph |
| | | 8.05153 km/h |
| | | 223.6536 cm/s |
| position | time (s) | (diff./total) |
| −1000 | −4.47 | −0.54023 |
| −500 | −2.24 | −0.526095 |
| −300 | −1.34 | −0.625028 |
| −250 | −1.12 | −0.660648 |
| −200 | −0.89 | −0.698291 |
| −150 | −0.67 | −0.733679 |
| −100 | −0.45 | −0.703403 |
| −75 | −0.34 | −0.559136 |
| −50 | −0.22 | −0.433631 |
| −25 | −0.11 | −0.184495 |
| 0 | 0.00 | 0.0029585 |
| 25 | 0.11 | 0.1844948 |
| 50 | 0.22 | 0.4336305 |
| 75 | 0.34 | 0.5591356 |
| 100 | 0.45 | 0.7034029 |
| 150 | 0.67 | 0.7336791 |
| 200 | 0.89 | 0.6982915 |
| 250 | 1.12 | 0.6606477 |
| 300 | 1.34 | 0.625028 |
| 500 | 2.24 | 0.5260948 |
| 1000 | 4.47 | 0.5402299 |

Figure 9:
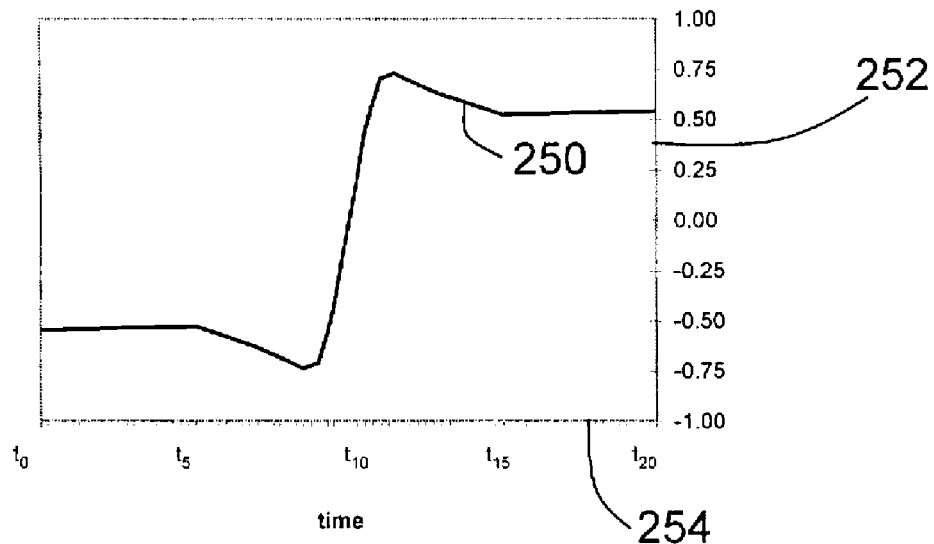
FIG. 9 is a graph depicting a reference time-dependent function yielding a dependent variable as a radiological source moves through a radiation monitoring station.
Figure 10:
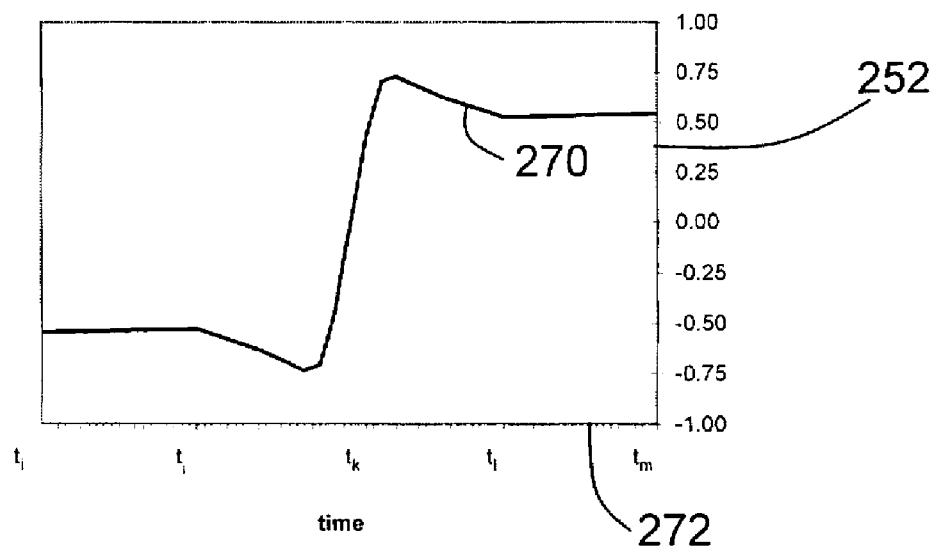
FIG. 10 is a graph depicting the time-dependent function of FIG. 7 calculated with hypothetical measured entry detector counts and hypothetical exit detector counts as a radiological source moves through a radiation monitoring station.

In FIG. 9 a known relative difference curve 250 is plotted on a Y-axis scale 252 over time plotted on an X-axis scale 254. FIG. 9 plots the data of Table 4, where illustrates a measured relative difference curve 270 plotted on the same Y-axis scale 252 as the curve of FIG. 8, over a recorded time interval plotted on an X-axis 272. It should be noted that the X-axis scale 272 may be computationally expanded or compressed to conform to the known X-axis scale 254 of FIG. 9. A statistical correlation function is used to calculate a correlation coefficient between the knows radiation count curve 250 of FIG. 9 and the measured relative difference curve 270 of FIG. 10. If the calculated correlation coefficient exceeds a minimum threshold value a detection alert is generated.

It should be noted that in embodiments where correlations between known relative difference curves and measured relative difference curves are used (such as the curses 250 and 270) illustrated in FIGS. 8 and 9), the correlation coefficient may be calculated between (a) the portion of known relative difference curve 250 from time $t_0$ to time $t_{10}$ and (b) the portion of the measured relative difference curve 270 between time $t_i$ and time $t_k$, in order to more likely generate a detection alert when the radiological source is at midline in the radiation monitoring station. These correlation calculations are examples of a function yielding a dependent variable (i.e. the correlation coefficient) where the function is defined at least in part by a first radiation level measurement and a second radiation level measurement and the dependent variable reaches a first threshold value (i.e., a minimum correlation coefficient) when the moving radiological source moves through a transition zone. Correlation techniques may be advantageously used to detect radiological sources when the count rates are unstable or noisy, and correlation techniques may also extend the sensitivity of detectors to smaller radiological sources.

In many embodiments the evaluation function includes a condition that the total radiation count exceeds a minimum threshold, which would occur at a time when the detected radiological source is indicated to be near the midline of the portal. In some embodiments only the expected and actual radiation counts from an entry gamma radiation detector may be used, and in some embodiments only the expected and actual radiation counts from an exit gamma radiation detector may be used.

In some embodiments various operational tactics may be employed to further improve the reliability and accuracy of detection alerts. For example, improvements may be achieved by taking frequent background measurements while maintaining a stable indoor environment (constant building ventilation, use of revolving entry and exit doors vs. standard swinging doors, etc.). Long-term average rates (measured during periods without alarms) may be used as approximations of the true background rate. This may eliminate the need for stopping traffic periodically to acquire background count rate data. Alternatively, in some applications, portals may be busy and then empty on a periodic basis (such as during intermittent train arrivals), and taking normal background measurements during the "slack" periods may improve accuracy and avoid measurement delays. Further improvements in the reduction of false alarms may be achieved by measuring relative differences in one or more radiation energy regions that are selected to better distinguish between likely innocuous and likely offensive radiological sources. For example, radiation measurements may be taken in radiation energy regions that are selected to minimize the detection of naturally occurring radioactive material, or to minimize the detection of medical isotopes.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for detecting radioactive emissions in a radiation monitoring station, the method comprising:
   acquiring a first radiation measurement from a moving radiological source over a first field of view in the radiation monitoring station;
   acquiring a second radiation measurement from the moving radiological source over a second field of view in the radiation monitoring station, wherein at least a portion of the second field of view is substantially distinct from the first field of view and a transition zone is established between at least a portion of the first field of view and the second field of view;
   calculating a dependent variable of a function defined at least in part by the first radiation level measurement and the second radiation level measurement;
   determining when the dependent variable reaches a first threshold value as the moving radiological source moves through the transition zone;
   determining a likelihood of presence of a medical isotope; and
   triggering a detection alert if (a) the dependent variable reaches the first threshold value and (b) the likelihood of presence of a medical isotope is less than a second threshold value.

2. The method of claim 1 further comprising a step of determining if the monitoring station is occupied and wherein the step of triggering a detection alert comprises triggering a detection alert if (a) the dependent variable reaches the first threshold value and (b) the monitoring station is occupied.

3. The method of claim 1 wherein the first radiation measurement and the second radiation measurement are acquired at least in part in a radiation energy region selected to minimize the detection of naturally occurring radioactive material.

4. The method of claim 1 wherein the step of calculating a dependent variable further comprises calculating ratios comprising the first radiation measurement and the second radiation measurement that yields the dependent variable.

5. The method of claim 4 wherein the calculation of ratios comprises calculating a percentage difference.

6. The method of claim 4 further comprising a step of determining if the monitoring station is occupied and wherein the step of triggering a detection alert comprises triggering a detection alert if (a) the dependent variable reaches the first threshold value and (b) the monitoring station is occupied.

7. The method of claim 4 further comprising a step of determining a likelihood of presence of a medical isotope and the step of triggering a detection alert comprises triggering a detection alert if (a) the dependent variable reaches the first threshold value and (b) the likelihood of presence of a medical isotope is less than a second threshold value.

8. The method of claim 4 wherein the first radiation measurement and the second radiation measurement are acquired at least in part in a radiation energy region selected to minimize the detection of naturally occurring radioactive material.

9. The method of claim 1 wherein the step of calculating a dependent variable further comprises calculating a correlation coefficient between (a) a function of the first radiation measurement and the second radiation measurement and (b) a reference function indicative of the presence of the radiological source in the transition zone, and wherein the first threshold value comprises a minimum correlation coefficient.

10. The method of claim 9 further comprising a step of determining if the monitoring station is occupied and wherein the step of triggering a detection alert comprises triggering a detection alert if (a) the dependent variable reaches the first threshold value and (b) the monitoring station is occupied.

11. The method of claim 9 wherein the first radiation measurement and the second radiation measurement are acquired at least in part in a radiation energy region selected to minimize the detection of naturally occurring radioactive material.

12. The method of claim 1 wherein the step of determining a likelihood of presence of a medical isotope comprises determining a likelihood of presence of $^{99m}$Tc.

13. The method of claim 1 wherein the step of determining a likelihood of presence of a medical isotope comprises determining a likelihood of presence of $^{131}$I.

14. A method for detecting radioactive emissions in a radiation monitoring station, the method comprising:
   measuring an entry radiation level and an exit radiation level in the portal monitoring station;
   summing the entry radiation level and the exit radiation level to obtain a total radiation level;
   calculating a percentage difference between the entry radiation level and the exit radiation level;
   determining if the total radiation level exceeds a first alarm threshold level; and
   triggering a detection alert if (a) the total radiation level exceeds the first alarm threshold level and (b) the percentage difference is less than a second alarm threshold value.

15. The method of claim 14 further comprising the steps of:
   calculating a statistical difference indicator between the entry radiation level and the exit radiation level; and
   if the statistical difference indicator exceeds a statistical difference threshold, then (a) calculating a time averaged difference between the entry radiation level and the exit radiation level, (b) calculating a third alarm threshold based in part upon the time averaged difference, (c) calculating a front rate difference, and (d) triggering a detection alert if the front rate difference exceeds the third alarm threshold.

16. The method of claim 14 further comprising the step of determining if the portal is occupied, and wherein the step of triggering a detection alert comprises triggering a detection alert if (a) the total radiation level exceeds the first alarm threshold level and (b) the percentage difference is less than a second alarm threshold value and (c) the portal is occupied.

17. An apparatus for detecting radioactive emissions in a radiation monitoring station, the apparatus comprising:
   a first radiation detection apparatus for acquiring a first radiation measurement from a moving radiological source over a first field of view;
   a second radiation detection apparatus for acquiring a second radiation measurement from the moving radiological source over a second field of view, wherein a transition zone is established between at least a portion of the first field of view and the second field of view; and
   a computational system for summing the first radiation measurement and the second radiation measurement yielding a total radiation level and for calculating a ratio comprising the first radiation measurement and the second radiation measurement yielding a dependent variable and for producing an alarm indication if the total radiation level exceeds a first threshold value and the dependent variable exceeds a second threshold value.

18. The apparatus of claim 17 wherein the second threshold value is a limit value.

19. The method of claim 17 wherein calculating a ratio comprises using (a) a numerator comprising the difference between the first radiation measurement and the second radiation measurement and (b) a denominator comprising a sum of the first radiation measurement and the second radiation measurement.

20. The method of claim 17 wherein calculating a ratio comprises using (a) a numerator comprising the difference between the first radiation measurement and the second radiation measurement and (b) a denominator comprising a sum of the first radiation measurement and the second radiation measurement minus a background rate.

* * * * *